J. A. FLEMING.
AIRCRAFT HAVING INHERENT STABILITY.
APPLICATION FILED OCT 2, 1918.

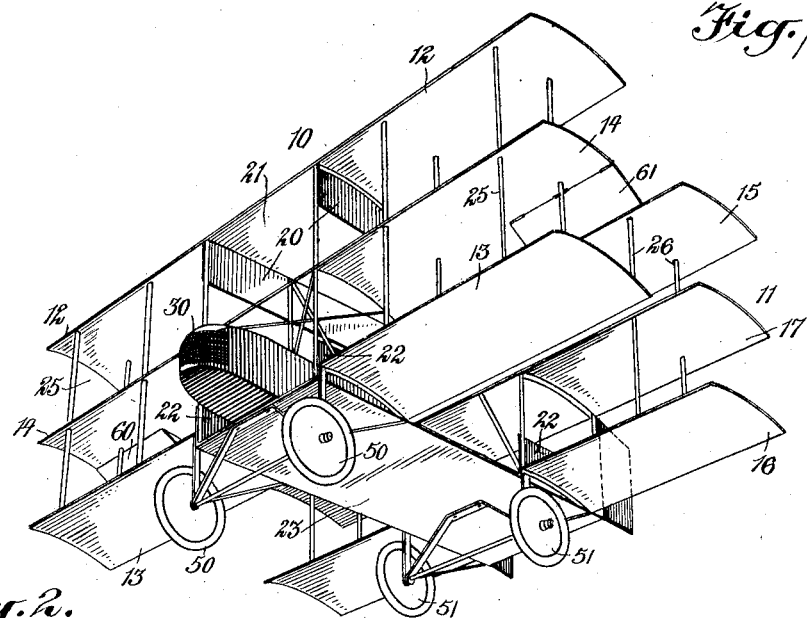
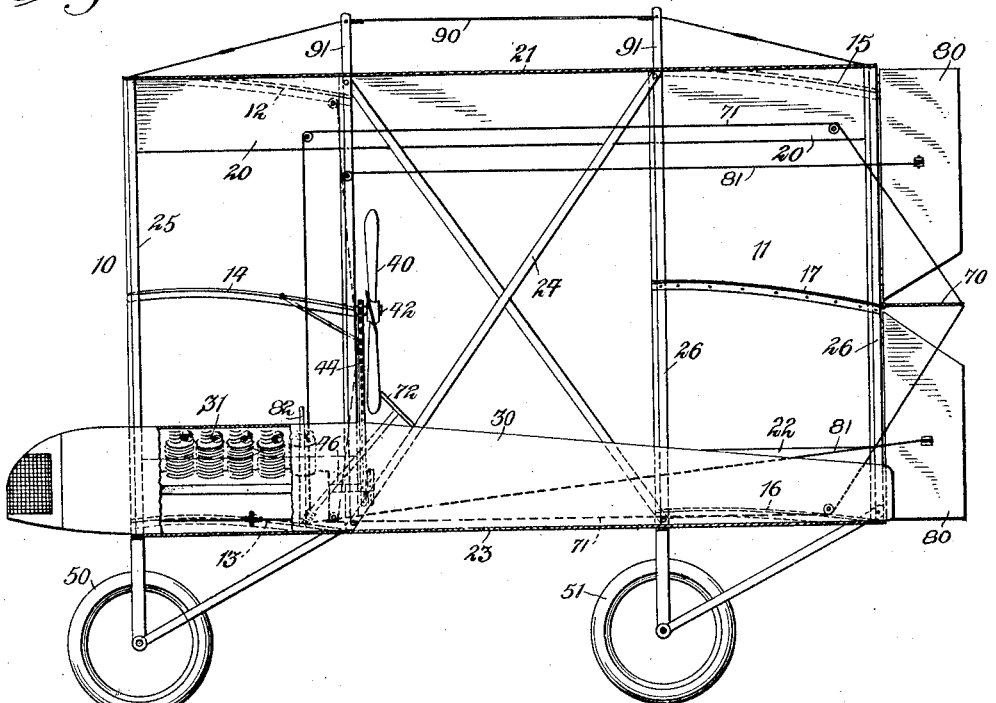

1,344,999.

Patented June 29, 1920.
3 SHEETS—SHEET 2.

Fig. 3.

WITNESSES

INVENTOR
John A. Fleming
BY
ATTORNEYS

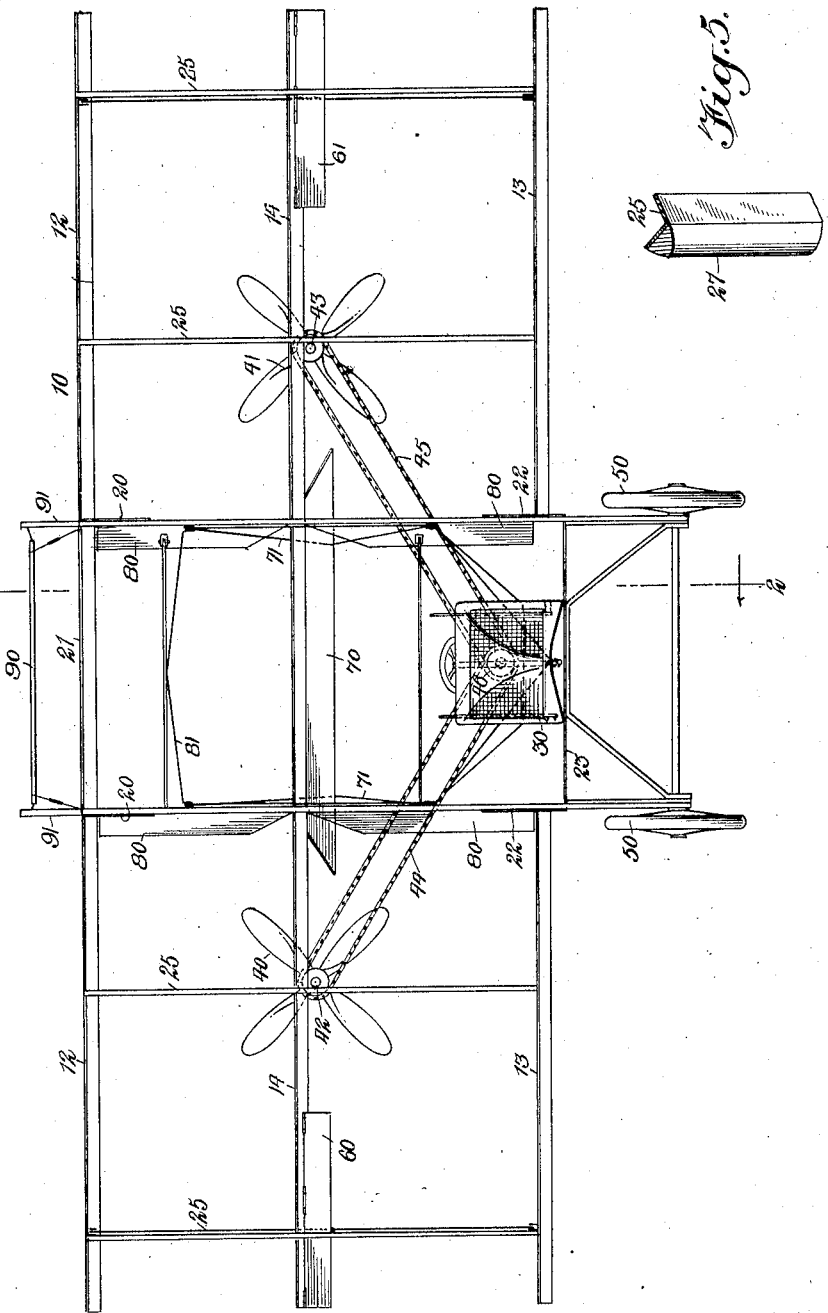

UNITED STATES PATENT OFFICE.

JOHN ANTHONY FLEMING, OF NEW YORK, N. Y.

AIRCRAFT HAVING INHERENT STABILITY.

1,344,999.     Specification of Letters Patent.      Patented June 29, 1920.

Application filed October 2, 1918. Serial No. 256,553.

*To all whom it may concern:*

Be it known that I, JOHN ANTHONY FLEMING, a citizen of the United States, and a resident of the city of New York, borough of Manhattan, in the county and State of New York, have invented a new and Improved Aircraft Having Inherent Stability, of which the following is a full, clear, and exact description.

The primary object of the invention is to provide a new and improved aircraft having inherent stability obtained by a new and novel arrangement of surfaces and structure making it an inherently safe and fool-proof aircraft. Another object of said arrangement of surfaces and structure is to obtain longitudinal stability. Another object of said arrangement of surfaces and structure is to obtain lateral stability and to prevent sideslipping of the aircraft. Another object of said arrangement of surfaces and structure is to obtain a maximum of lift. Another object of said arrangement of surfaces and structure is to obtain a low forward center of gravity by disposing of the greatest weight to the forward end of the body of the aircraft.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a perspective view of the aircraft;

Fig. 2 is a longitudinal section of the same on the line 2—2 of Fig. 4;

Fig. 3 is a plan view of the same;

Fig. 4 is a front elevation of the same; and

Fig. 5 is a sectional perspective view of a portion of one of the posts connecting the sustaining planes with each other.

The aircraft illustrated in the drawings is in its general construction in the form of a double triplane having fore and aft sets of sustaining planes 10 and 11, of which the fore set of sustaining planes 10 comprises a top sustaining plane 12, a bottom sustaining plane 13 and an intermediate sustaining plane 14, and the said aft set of sustaining planes 11 comprises a top sustaining plane 15, a bottom sustaining plane 16 and an intermediate sustaining plane 17. The inner ends of the top sustaining front planes 12 and the inner ends of the top sustaining rear planes 15 join depending side surfaces 20 of a top longitudinal stabilizing plane 21 and the said side surfaces 20 extend throughout the length of the said longitudinal plane 21. The inner ends of the bottom sustaining front planes 13 and the inner ends of the bottom sustaining rear planes 16 join upwardly extending or rising side surfaces 22 of a bottom longitudinal stabilizing plane 23, and the said side surfaces 22 extend only through the width of the planes 13 and 16 and the portion of the longitudinal plane 23 between the planes 13 and 16 is preferably without such rising side surfaces. It will be noticed that the side surfaces 20 and 22 of the longitudinal planes 21 and 23 tend to confine the air between them thereby increasing the lift and forcing the aircraft into longitudinal equilibrium. It will further be noticed that the side surfaces 20 and 22 offer resistance to the lateral motion of the aircraft thereby preventing side slipping of the aircraft. The longitudinal planes 21 and 23 are connected with each other at the sides by braces 24 located intermediate the fore and aft sets of sustaining planes 10 and 11.

The sustaining planes 12, 13 and 14 are connected with each other by posts 25 and similar posts 26 connect the sustaining planes 15, 16, 17 with each other to give the desired rigidity to the said planes. Each of the said posts 25 and 26 is made of angle iron provided with a facing 27 of wood made triangular in cross section, as plainly shown in Fig. 5, to offer as little resistance as possible to the air.

The longitudinal bottom plane 23 supports a suitable body 30 for carrying passengers, freight, military equipment or the like, according to the use made of the aeroplane. In the body 30 directly above the forward portion of the longitudinal plane 23 and in transverse alinement with the fore and aft bottom planes 13 is mounted a suitable motor 31 for driving two propellers 40 and 41 located immediately adjacent the rear edge of the intermediate sustaining plane 14 of the fore set of sustaining planes 10, the centers of the said propellers 40 and 41 being located approximately midway between the median line of the sustaining plane 14 and the outer ends thereof, as will be readily understood by reference to Figs. 3 and 4. The shafts 42 and 43 of the propellers 40 and 41 are journaled in suitable bearings arranged on the under side of the sustaining plane 14, and the usual sprocket wheel and sprocket chain connections 44 and 45 connect the propeller shafts 42 and 43 with the shaft 46 of the motor, as indicated in the drawings. By locating the motor 31, that is, the greatest weight, in the manner described and as shown in Fig. 2, a low forward center of gravity is obtained, thus providing the aircraft with inherent stability and thereby making the aircraft safe to fly and without danger of its turning upside down. It will also be noticed that the low forward center of gravity causes the aircraft to act as if provided with a keel. The center of gravity is located approximately at the middle of the lower front plane 13, as indicated in Figs. 2 and 3.

From the foregoing it will be noticed that by the combined effect of the longitudinal planes having side surfaces and the low forward center of gravity longitudinal as well as lateral stability is obtained to prevent sideslipping of the aircraft, to prevent it from upsetting and to increase the lifting capacity.

On the under side of the bottom connecting member 23 are mounted the usual front and rear traction wheels 50 and 51 for sustaining the aircraft on the ground.

The intermediate sustaining plane 14 of the fore set of sustaining planes 10 has the rear outer portions formed into ailerons 60 and 61 hinged at their forward edges to swing up and down and connected by a suitable mechanism with the body 30 to be under the control of the operator.

On the rear middle portion of the intermediate sustaining plane 17 of the aft set of sustaining planes 11 is mounted to swing up and down a plane 70 for ascending or descending purposes and this plane 70 is connected by the usual controlling mechanism 71 for a steering wheel 72 mounted in the body 30 and under the control of the operator in charge of the machine. Steering rudders 80 are pivoted on the rear of the aft set of sustaining planes 11 to swing sidewise and are connected by the usual controlling mechanism 81 with a hand lever 82 mounted in the body 30 and under the control of the operator of the aircraft. An aerial 90 for wireless telegraphy or telephoning is mounted on suitable brackets 91 arranged on the top of the upper longitudinal plane 21, and this aerial is connected with the usual instruments mounted in the body 30 to permit of establishing connection with a distant station.

It is understood that the rear planes on account of being fixed surfaces set at a positive angle have a positive lift and hence carry a percentage of the load.

The longitudinal planes 21 and 23 also carry a percentage of the load due to the retention of the air between the sides of the said planes 21 and 23, and which sides prevent the escape of air except through the rear opening.

It will further be noticed that the rear planes receive the wash or drift from the propellers thereby further increasing the lift.

Having thus described my invention, I claim as new and desire to secure by Letters Patent:

1. An aircraft, comprising fore and aft sets of spaced transverse sustaining planes, a longitudinally extending stabilizing plane having air retaining side surfaces and connecting the uppermost of the said sustaining planes with each other, and a longitudinally extending stabilizing plane having air retaining side surfaces and connecting the lowermost of the said sustaining planes with each other.

2. An aircraft comprising fore and aft sets of spaced transverse sustaining planes, a longitudinally extending stabilizing plane having air retaining side surfaces and connecting the uppermost of the said sustaining planes with each other, a longitudinally extending stabilizing plane having air retaining side surfaces and connecting the lowermost of the said sustaining planes with each other, and means locating the center of gravity of the aircraft at the lower forward portion thereof.

3. An aircraft, comprising fore and aft sets of spaced transverse sustaining planes, an upper longitudinal stabilizing plane having depending side surfaces, said stabilizing plane connecting the uppermost sustaining planes of the said sets of fore and aft sustaining planes with each other, a longitudinal lower stabilizing plane connecting the lowermost planes of the two sets of sustaining planes with each other, said lower stabilizing plane having upwardly projecting side surfaces extending through the width of said lowermost planes of the two sets of sustaining planes, each of the said sets having at least three planes, and ailerons mounted to swing up and down at the rear of the intermediate sustaining planes of the said sets of fore and aft sustaining planes.

4. An aircraft, comprising fore and aft sets of spaced transverse sustaining planes, an upper longitudinal stabilizing plane having depending side surfaces, said stabilizing plane connecting the uppermost sustaining planes of the said sets of fore and aft sustaining planes with each other, a longitudinal lower stabilizing plane connecting the lowermost planes of the two sets of sustaining planes with each other, said lower stabilizing plane having upwardly projecting side surfaces extending through the width of said lowermost planes of the two sets of sustaining planes, and divided twin rudders attached to the upright structure of the said aft sustaining planes.

5. An air craft, comprising fore and aft sets of spaced sustaining planes, each set having at least three planes, top and bottom longitudinal stabilizing planes connecting the uppermost and the lowermost planes of the two sets of sustaining planes with each other at their middle, posts connecting the sustaining planes in each set of fore and aft sustaining planes with each other, and divided twin rudders mounted on the rear posts.

6. An aircraft, comprising fore and aft sets of spaced sustaining planes, each set having at least three planes, top and bottom longitudinal stabilizing planes connecting the uppermost and the lowermost planes of the two sets of sustaining planes with each other at their middle, posts connecting the sustaining planes in each set of fore and aft sustaining planes with each other, an elevating plane mounted on the rear posts at the rear end of the intermediate sustaining plane, and twin rudders mounted on the rear posts one above the elevating rudder and the other below the same.

7. An aircraft, comprising fore and aft sets of spaced transverse sustaining planes, an upper longitudinal stabilizing plane having depending side surfaces, said stabilizing plane connecting the uppermost sustaining planes of the said sets of fore and aft sustaining planes with each other, and a longitudinal lower stabilizing plane connecting the lowermost planes of the two sets of sustaining planes with each other, said lower stabilizing plane having upwardly projecting side surfaces extending through the width of said lowermost planes of the two sets of sustaining planes.

8. An aircraft, comprising fore and aft sets of spaced transverse sustaining planes, each set having at least three planes, upper and lower longitudinal stabilizing planes connecting the two sets of spaced sustaining planes with each other, a motor located at the forward end of the lowermost stabilizing plane, and propellers located at the rear of the intermediate sustaining plane of the fore set of sustaining planes, and intermediate the median line and the outer ends of the said intermediate sustaining planes.

9. An aircraft, comprising fore and aft sets of spaced sustaining planes, each set having at least three planes, top and bottom longitudinal stabilizing planes connecting the uppermost and the lowermost planes of the two sets of sustaining planes with each other at their middle, and posts connecting the sustaining planes in each set of fore and aft sustaining planes with each other, each post being formed of angle iron having a triangular facing of wood.

JOHN ANTHONY FLEMING.